United States Patent [19]

Miyazoe et al.

[11] Patent Number: 5,854,350

[45] Date of Patent: Dec. 29, 1998

[54] CURABLE RESIN COMPOSITION, COATING COMPOSITION, COATING METHOD AND COATED ARTICLE

[75] Inventors: Seigo Miyazoe, Takatsuki; Akira Fushimi, Ikoma; Masanobu Inoue, Nishinomiya, all of Japan

[73] Assignee: Nippon Paint Co., Ltd., Osaka, Japan

[21] Appl. No.: 718,504

[22] PCT Filed: Mar. 31, 1995

[86] PCT No.: PCT/JP95/00618

§ 371 Date: Nov. 8, 1996

§ 102(e) Date: Nov. 8, 1996

[87] PCT Pub. No.: WO95/27010

PCT Pub. Date: Oct. 12, 1995

[30] Foreign Application Priority Data

Apr. 1, 1994 [JP] Japan ..................................... 6-087523

[51] Int. Cl.$^6$ ....................... C09D 133/06; C09D 183/06
[52] U.S. Cl. ...................... 525/100; 427/410; 427/407.1; 428/447; 428/450; 525/476
[58] Field of Search .............................. 525/100; 427/410, 427/407.1; 428/447, 450

[56] References Cited

U.S. PATENT DOCUMENTS 5,464,901  11/1995  Yoshikawa et al. ..................... 525/103

FOREIGN PATENT DOCUMENTS

| 0 015 484 A1 | 2/1980 | European Pat. Off. . |
| 450 963 A1 | 9/1991 | European Pat. Off. . |
| 0 450 963 A1 | 10/1991 | European Pat. Off. . |
| 0 588 560 A3 | 3/1994 | European Pat. Off. . |
| WO 94/11427 | 5/1994 | WIPO . |

*Primary Examiner*—Margaret W. Glass
*Attorney, Agent, or Firm*—Pollock, Vande Sande & Amernick

[57] ABSTRACT

A curable resin composition is provided which insures good curability even without using an aminoplast curing agent and has an excellent high-solid feature. The composition comprises 5 to 80 weight % of a polymer containing free and esterified carboxyl groups and having an acid value of 50 to 300 mg KOH/g (1e), 1 to 80 weight % of a polymer containing hydroxyl and epoxy groups and having an epoxy equivalent of 200 to 1000 and a hydroxyl equivalent of 250 to 1500 (2d), and 1 to 50 weight % of a silicone polymer containing epoxy and/or alkoxyl groups (3a).

19 Claims, No Drawings

CURABLE RESIN COMPOSITION, COATING COMPOSITION, COATING METHOD AND COATED ARTICLE

FIELD OF THE INVENTION

The present invention relates to a curable resin composition capable of forming a coating film of excellent quality in terms of acid resistance, mar resistance and appearance and, therefore, finding application in the fields of automotive top coatings, coil coatings, household electrical appliances, plastics and electrical materials, among other uses, and to a coating composition, a method of forming a coating film, and a coated article each as obtainable or implementable using said curable resin composition.

PRIOR ART

Automotive top coatings and a variety of coatings dedicated to the same purpose are required to possess a function to provide an aesthetic appearance and prolong the life of the car by evading damages due to winds and rains, stones, muds and dust by constituting the outermost layer of the coating structure inclusive of the primer and intermediate coating layers on the body of a car or the like and, therefore, must provide a film with high mar resistance and good appearance. The resin compositions used in such coatings are so designed that they will show viscosities before coating within a certain range that facilitates coating and, after application; may be easily cured to provide necessary resistance and appearance, that is to say they may exhibit a long storage stability and the optimum curability.

The conventional curing system for such automotive top coatings is an aminoplast curing agent such as a melamine resin which reacts with the hydroxyl groups of a hydroxyl group-containing polymer to achieve curing. However, the above curing system is unsatisfactory in acid resistance and the coating film obtained is liable to develop defects owing to acidic rains which have recently been a major problem. The defects are generally attributed to the triazine nucleus of the melamine resin and no improvement in acid resistance could be realized unless the use of melamine resin was avoided or restricted to a sufficiently low level to avoid said defects.

As a curing system not using a melamine resin, a method employing a polyisocyanate compound is known but the toxicity problem associated with the isocyanate has not been resolved. Therefore, a curable resin composition of high nonvolatile content comprising a polyoxide of low molecular weight, a hydroxyl group-containing polyfunctional substance of low molecular weight, a curing agent essentially comprising an anhydride, and an acid catalyst was proposed (Japanese Kokai Publication Sho-63-84674). However, this composition was found to have the disadvantage that because its ingredients are so reactive to each other that it cannot be stored in one package, presenting a storage stability problem.

In view of the above state of the art, a technology employing both (1) a half-esterified copolymer and (2) an epoxy group- and hydroxyl group-containing compound in a defined ratio to overcome the above-mentioned disadvantage was disclosed (Japanese Patent Application Hei-2-91299). This composition provided high acid resistance to overcome the above disadvantage but was inadequate in mar resistance.

In view of the above problem, a technology was proposed in which, in addition to the-use of both (1) a half-esterified (inclusive of half-thioesterified and half-amidated) copolymer and (2) an epoxy group- and hydroxyl group-containing compound, (3) at least one member selected from among an acrylic polymer, a fluorine-containing copolymer and a polyester resin, and (4) a melamine resin are used to provide a composition according to a well-considered formula to thereby overcome the above-mentioned disadvantage (Japanese Kokai Publication Hei-4-363374). Although it contains a melamine resin, this composition satisfies the acid resistance requirement to a certain extent and provides good mar resistance.

In the above technologies, the curing systems used essentially require sufficiently high-functional group concentrations, so that the inevitable high viscosities called for fair amounts of solvents. As such, these technologies are unsuitable for production in areas where regulations for environmental protection such as control over VOC (volatile organic compounds) are in force and, moreover, are deterrents to control of atmospheric pollution. Therefore, even in the field of high-solid compositions, a demand was felt for provision of a composition improved in if the above aspect.

Under the circumstances, as the result of research into a high-solid resin composition satisfying the above performance requirements, a technology was disclosed in which, in addition to the use of both (1) a half-esterified copolymer and (2) an epoxy group- and hydroxyl group-containing compound, (3) a hydroxyl group- and carboxyl group-containing silicone polymer is used to constitute a composition according to a defined formula to thereby overcome the above disadvantages (Japanese Patent Application Hei-5-224239).

The above technology adopts an acid anhydride curing system and meets both the acid resistance and high-solid requirements but does not satisfy more sophisticated appearance and mar resistance requirements. Then, it was discovered that the above disadvantages can be obviated by a technology such that, in addition to the use of (1) a half-esterified copolymer, (2) an epoxy group- and hydroxyl group-containing polymer and (3) a hydroxyl group- and carboxyl group-containing silicone polymer, (4) at least one pigment-dispersing resin selected from among alkyd resin, polyester resin, and basic substance-modified products of them, (5) a pigment, and (6) an aminoplast curing agent (melamine resin) are used to constitute a composition according to a defined formulation and accordingly a Letters Patent was applied for (Japanese Patent Application Hei-5-303849).

It will be obvious from the process of development of the above technologies that in the effort to improve resin compositions for coatings such as automotive top coatings, addition of an aminoplast curing agent was first contemplated in an attempt to insure a sufficiently long storage stability and optimal curability and a subsequent endeavor to find a new curing system over coming the drawback of consequently reduced acid resistance resulted in a resin composition is comprising both a half-esterified copolymer and an epoxy group-and hydroxyl group-containing polymer and not containing an aminoplast curing agent, which was followed, in the course of research for developing a high-solid coating, by the idea of employing a silicone polymer having both hydroxyl and carboxyl groups.

However, because the silicone polymer used in the above technology is a silicone polymer provided with both carboxyl and hydroxyl functions through reaction of the hydroxyl group of a silicone polymer with an acid anhydride group, it has the disadvantage of poor curability due to an insufficient number of functional groups, with the result that when it is used in a coating composition, the glass transition temperature (Tg) cannot be increased. This disadvantage can be overcome by incorporating a limited amount of an aminoplast curing agent for improved curability but this practice inevitably entails a certain decrease in the acid resistance which is necessary for withstanding the influence of acidic rains.

In view of the above state of the art, the present invention has for its object to provide quite a new curable resin composition which exhibits good curability essentially without the aid of an aminoplast curing agent and, in addition, has a fully high-solid characteristic.

SUMMARY OF THE INVENTION

The gist of the present invention resides in the technology that a curable resin composition is provided by using 5 to 80 weight % of a polymer containing free and esterified carboxyl groups and having an acid value of 50 to 300 (mg KOH/g) (1e) as obtainable by reacting an acid anhydride group-containing polymer (1c), which is obtainable by copolymerizing 10 to 40 weight % of an acid anhydride group-containing ethylenically unsaturated monomer (1a) with 90 to 60 weight % of a copolymerizable other ethylenically is unsaturated monomer (1b), with a monohydric alcohol of 1 to 12 carbon atoms (1d) in the ratio (the number of mols of acid anhydride group in acid anhydride-containing polymer (1c))/(the number of mols of hydroxyl group in monohydric alcohol (1d)) of 1/10 to 1/1, 1 to 80 weight % of a hydroxyl group- and epoxy group-containing polymer having an epoxy equivalent of 200 to 1000 and a hydroxyl equivalent of 250 to 1500 (2d) as obtainable by copolymerizing 5 to 60 weight % of a hydroxylalkyl (meth)acrylate monomer (2a) of the general formula (I):

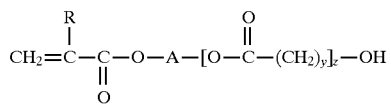

(wherein R represents hydrogen or methyl; A represents a straight-chain or branched alkylene group of 2 to 8 carbon atoms; y represents a whole number of 3 to 7; z represents a whole number of 0 to 4) with 10 to 60 weight % of an epoxy group-containing ethylenically unsaturated monomer (2b) and 0 to 85 weight % of an ethylenically unsaturated monomer (2c) copolymerizable therewith, and 1 to 50 weight t of an epoxy group- and/or alkoxyl group-containing silicone polymer (3a) of the general formula (II):

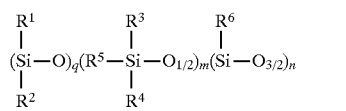

(wherein $R^1$, $R^2$, $R^3$, $R^4$, $R^5$, and $R^6$ are the same or different and each represents alkyl of 1 to 10 carbon atoms, phenyl, phenethyl, alkoxyl of 1 to 5 carbon atoms, $R^7$-Si$(OR^8)_3$, $R^7$-Si$(OR^8)_2$CH$_3$, $R^7$-Si$(OR^8)$(CH$_3)_2$, or $R^7$-Y; $R^7$ represents a straight-chain or branched alkylene group which may have an ether bond and/or an ester bond; $R^5$ represents alkyl of 1 to 5 carbon atoms; Y represents an epoxy group-containing acyclic or cyclic hydrocarbon residue: q represents a whole number of 1 to 20, m represents a whole number of 0 to 4, n represents a whole number of 0 to 2; the order of the parenthesized groups occurring in q, m and n repetitions is random and not restricted to the formula shown). The compounding percentages of (1e), (2d) and (3a) are based on the nonvolatile matter in the above composition, and the proportions of the monomers for said components (1e) and (2d) are based on the total amount of monomers constituting each component.

The present invention is further concerned with a coating composition containing said curable resin composition, a method of forming a coating film using said coating composition, and a coated article as obtained using said coating composition.

DETAILED DESCRIPTION OF THE INVENTION

The first component constituting the curable resin composition of the present invention is a polymer (1e) containing both free and esterified carboxyl groups and having an acid value of 50 to 300 (mgKOH/g). This polymer (1e) can be prepared by reacting an acid anhydride group-containing polymer (1c) with a monohydric alcohol (1d) of 1 to 12 carbon atoms for half-esterification.

The acid anhydride group-containing polymer (1c) mentioned above can be prepared by copolymerizing 10 to 40 weight %, preferably 15 to 30 weight %, of an acid anhydride group-containing ethylenically unsaturated monomer (1a) with 60 to 90 weight %, preferably 70 to 85 weight %, of a copolymerizable other ethylenically unsaturated monomer (1b).

When the proportion of said acid anhydride group-containing ethylenically unsaturated monomer (1a) is less than 10 weight %, no sufficient curability can be obtained, while the use of an excess over 40 weight % results in an excessively hard, brittle coat with inadequate weather resistance.

The acid anhydride group-containing ethylenically unsaturated monomer (1a) mentioned above is not particularly limited in kind only if it is an ethylenically unsaturated monomer containing a carboxylic anhydride group and includes itaconic anhydride, maleic anhydride and citraconic anhydride, among others.

The other ethylenically unsaturated monomer (1b) copolymerizable with said acid anhydride group-containing ethylenically unsaturated monomer (1a) is not particularly limited in kind, either, only if it does not adversely affect the acid anhydride group. Thus, monomers of 2 to 15 carbon atoms containing one ethylenically unsaturated bond are preferred and those of 3 to 12 carbon atoms are still more preferred. Moreover, the use of two or more different monomers particularly contributes to enhanced compatibility of resins.

The free carboxyl groups of the polymer (1e) containing both free and esterified carboxyl groups can be derived from the use of a carboxyl group-containing monomer (1b$^2$) as said copolymerizable other ethylenically unsaturated monomer (1b) for copolymerization with said (1a), followed by reaction of the resulting polymer (1c) with the monohydric alcohol (1d) as will be described hereinafter. In this case, said carboxyl group-containing monomer (1b$^2$) is used only in an amount providing for an acid value within the range of 50 to 300 (mgKOH/g) for (1e). The kind of said carboxyl group-containing monomer (1b$^2$) is not particularly limited. Thus, acrylic acid and methacrylic acid, among others, can be used and one or more of them can be used in combination.

The copolymerizable other ethylenically unsaturated monomer (1b) mentioned above further includes, in addition to said monomer (1b$^2$), such other monomers as styrene and its derivatives, e.g. α-methylstyrene, para-t-butylstyrene, etc.; (meth)acrylic esters such as methyl (meth)acrylate, ethyl (meth)acrylate, propyl (meth)acrylate, n-butyl (meth) acrylate, i-butyl (meth)acrylate, t-butyl (meth)acrylate, 2-ethylhexyl (meth)acrylate, lauryl (meth)acrylate, cyclohexyl (meth)acrylate, isobornyl (meth)acrylate, etc.; and VeoVa-9, VeoVa-10, etc. (manufactured by Shell). When styrene or a styrene derivative is used for said copolymerizable other ethylenically unsaturated monomer (1b), it is used preferably within the range of 0 to 40 weight %. If the limit of 40 weight % is exceeded, weather resistance is adversely affected.

The copolymerization reaction between said acid anhydride group-containing ethylenically unsaturated monomer (1a) and said copolymerizable other monomer (1b) can be carried out in the known manner, for example by a radical polymerization method in solution, either at atmospheric pressure or at elevated pressure and a polymerization temperature of 100° to 200° C. for a polymerization time of 3 to 8 hours. As the polymerization initiator, an azo type initiator or a peroxide type initiator can be advantageously employed and its preferred amount is 0.5 to 15 parts by weight relative to 100 parts by weight of the total monomer. To the above monomer composition, other additives such as a chain transfer agent can be added.

The preferred number average molecular weight of the acid anhydride group-containing polymer (1c) obtained by the above copolymerization reaction is 1500 to 8000. If the number average molecular weight is less than 1500, the curability of the curable resin composition will be inadequate. If it exceeds 8000, the polymer viscosity is increased to interfere with the manufacture of a high-solid coating composition. The more preferred molecular weight range is 1800 to 4000. These molecular weight values can be determined by, for example, gel permeation chromatography (GPC).

The above-mentioned acid anhydride group-containing polymer (1c) preferably contains at least 2 acid anhydride groups per molecule and more preferably contains 2 to 15 acid anhydride groups per molecule. If the number of acid anhydride groups is less than 2, no sufficient curability can be expected. If it is greater than 15, the cured product will be too hard and brittle and lacking in adequate weather resistance.

As the above acid anhydride group-containing polymer (1c) is reacted with the monohydric alcohol (1d), it is half-esterified so that a polymer containing both free and esterified carboxyl groups can be obtained. The end point of half-esterification reaction can be confirmed from substantial disappearance of the absorption of acid anhydride groups at about 1785 $cm^{-2}$ on the infrared absorption spectrum.

The monohydric alcohol (1d) mentioned above is a low molecular weight compound containing 1 to 12 carbon atoms and preferably a compound of 1 to 8 carbon atoms, Where the carbon number is 1 to 12, the low molecular weight monohydric alcohol (1d) is vaporized on heating to favor the regeneration of the acid anhydride group.

The monohydric alcohol (1d) that can be used includes a variety of alcohols of low molecular weight such as methanol, ethanol, propanol, butanol, methylcellosolve (trademark), ethylcellosolve (trademark), dimethylaminoethanol, diethylaminoethanol, acetol, allyl alcohol, propargyl alcohol, furfuryl alcohol and so on. Among them, acetol, allyl alcohol, propargyl alcohol, methanol and furfuryl alcohol are preferred.

The ratio of said acid anhydride group-containing polymer (1c) and monohydric alcohol (1d) for use in the above-mentioned half-esterification reaction is 1/10 to 1/1 in terms of the ratio of the number of mols of acid anhydride group in (1c) to the number of mols of hydroxyl group in (1d). If the ratio is less than 1/10, the excess monohydric alcohol tends to cause popping at the curing step. On the other hand, if the ratio exceeds 1/1, the unreacted acid anhydride groups detract from the storage stability. The more preferred ratio is 1/8 to 1/1.1.

The above half-esterification reaction can be carried out in the conventional manner at a temperature from room temperature to 120° C.

The polymer (1e) containing free and esterified carboxyl groups and having an acid value of 50 to 300 (mgKOH/g) as obtained by the above reaction is used as a first component of the curable resin composition of the present invention. If the acid value is less than 50, curability will be poor. If 300 is exceeded, excessive hardness and decreases in weather resistance will be encountered. Neither of such polymers can be used for the purposes of the present invention.

The second component of the curable resin composition of this invention is a hydroxyl group- and epoxy group-containing polymer (2d). The epoxy equivalent of the polymer (2d) is 200 to 1000 and the hydroxyl equivalent thereof is 250 to 1500. If the epoxy equivalent is less than 200, excessive hardening results in a brittle film. On the other hand, if 1000 is exceeded, the curability of the curable resin composition will become insufficient. Moreover, if the hydroxyl equivalent is less than 250, the water resistance of the cured coat will be insufficient. On the other hand, if 1500 is exceeded, only insufficient curability can be obtained. The epoxy equivalent is preferably 250 to 800 and, for still better results, 300 to 700. The hydroxyl equivalent is preferably 300 to 1200 and, for still better results, 400 to 1000.

The above polymer (2d) containing hydroxyl and epoxy groups can be obtained by copolymerizing 5 to 60 weight %, preferably 15 to 40 weight %, of a hydroxyalkyl (meth) acrylate of general formula (I) with 10 to 60 weight %, preferably 15 to 50 weight %, of an epoxy group-containing ethylenically unsaturated monomer (2b), and where necessary, further with 0 to 85 weight %, preferably 10 to 70 weight %, of one or more other ethylenically unsaturated monomers (2c).

If the proportion of said hydroxyalkyl (meth)acrylate (2a) is less than 5 weight %, no sufficient curability can be obtained. On the other hand, if 60 weight % is exceeded, compatibility is sacrificed so that the reaction cannot proceed to a sufficient extent. Moreover, if the proportion of said epoxy group-containing ethylenically unsaturated monomer (2b) is less than 10 weight %, curability will be insufficient. If 60 weight % is exceeded, excessive hardening and poor weather resistance are encountered.

The carbon number of the hydroxyalkyl moiety of said hydroxyalkyl (meth)acrylate monomer (2a) is 2 to 20 and preferably 2 to 10. If the carbon number is too large, the inter-crosslink molecular weight will be undesirably too large.

The hydroxyalkyl (meth)acrylate monomer (2a) that can be used includes but is not limited to 2-hydroxy ethyl (meth)acrylate, hydroxypropyl (meth)acrylate, 4-hydroxybutyl (meth)acrylate, 6-hydroxyhexyl (meth) acrylate, etc. and reaction products of these monomers with ε-caprolactone. These compounds are available from commercial sources, and "Placcel FM1" and "Placcel FA1" (both manufactured by Daicel Chemical Industries) can be mentioned. Moreover, such compounds can be prepared by esterifying (meth)acrylic acid with a large excess of a diol compound.

The epoxy group-containing ethylenically unsaturated monomer (2b) mentioned above includes glycidyl (meth) acrylate, 2-methylglycidyl (meth)acrylate, 3,4-epoxycyclohexanylmethyl (meth)acrylate and so on.

The copolymerizable ethylenically unsaturated monomer (2c) mentioned above includes, among others, these compounds mentioned specifically as examples of said other ethylenically unsaturated monomer (1b) copolymerizable with acid anhydride group-containing ethylenically unsaturated monomer (1a).

The copolymerization reaction involving said hydroxyalkyl (meth)acrylate monomer (2a), epoxy group-containing ethylenically unsaturated monomer (2b) and copolymerizable ethylenically unsaturated monomer (2c) can be carried out in the known manner, for example by the radical polymerization method in solution, at atmospheric pressure or at elevated pressure and a polymerization temperature of 100° to 200° C. for a polymerization time of 3 to 8 hours. As the polymerization initiator, a conventional initiator of the azo type or of the peroxide type can be success fully employed. The above polymerization initiator is used preferably in a proportion of 0.5 to 15 weight % based on the total monomer in the reaction system. Additives such as a chain transfer agent can also be added to said monomer composition.

The number average molecular weight of the hydroxyl group- and epoxy group-containing polymer (2d) as obtained by the above copolymerization reaction is preferably 1500 to 8000 and, for still better results, 1800 to 4000. If the number average molecular weight exceeds 8000, the polymer viscosity becomes increased to interfere with preparation of a high-solid coating composition. On the other hand, if the molecular weight is less than 1500, the curability of the curable resin composition will be insufficient.

The third component of the curable resin composition of the present invention is a silicone polymer containing epoxy and/or alkoxyl groups (3a). This polymer is represented by general formula (II).

The epoxy group-containing silicone polymer includes "NUC Silicone" series manufactured by Nippon Unicar Co., among others. The alkoxyl group-containing silicone polymer includes "KC-89S" manufactured by Shin-Etsu Chemical Industries, among others. The silicone polymer containing epoxy and alkoxyl groups includes "MKC Silicate MSEP2" series manufactured by Mitsubishi Kasei Corporation and "NUC Silicone" series manufactured by Nippon Unicar Co., among others.

The technology of producing a silicone polymer containing epoxy and/or alkoxyl groups is described in. Synopsis of 1990 symposium for the Chemistry of organo silicon materials, pp. 29 to 30.

The epoxy groups in said silicone polymer (3a) exist in intermediate or terminal positions of the acyclic or cyclic hydrocarbon chains. In silicone polymer (3a), the epoxy group-containing acyclic or cyclic hydrocarbon designated by Y may, for example, be represented by any of the following formulas.

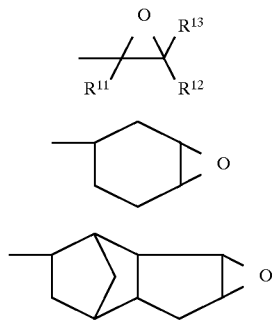

In the above formulas, $R^{11}$, $R^{12}$ and $R^{13}$ each represents a hydrocarbon of 0 to 4 carbon atoms.

In this specification, "epoxy equivalent" means the number of grams of a compound containing one gram equivalent of epoxy group, "alkoxyl equivalent" means the number of grams of a compound containing one gram equivalent of alkoxyl group, and "hydroxyl equivalent" means the number of grams of a compound containing one gram equivalent of hydroxyl group.

The epoxy equivalent of the silicone polymer (3a) according to the present invention is 100 to 1500 and the alkoxyl equivalent thereof is 50 to 1500. If the epoxy equivalent is less than 100, the storage stability of the coating is sacrificed. If it exceeds 1500, poor curability will result. The preferred range of epoxy equivalent is 140 to 1000 and the more desirable range is 180 to 700. The preferred range of alkoxyl equivalent is 60 to 800 and the more desirable range is 80 to 500.

In the present invention, a hydroxyl group- and carboxyl group-containing silicone polymer (3b) can be admixed along with said epoxy- group and/or alkoxyl group-containing silicone polymer (3a). The silicone polymer (3b) containing hydroxyl and carboxyl groups can be obtained by subjecting a hydroxyl group-containing silicone polymer (3c) and an acid anhydride group-containing compound (3d) to half-esterification reaction.

The hydroxyl group-containing silicone polymer (3b) mentioned above is available from commercial sources, and "KR-2001" manufactured by Shin-Etsu Silicone Co. and "NUC-Silicone" series manufactured by Nippon Unicar, the chemical formulas of which are presented below, can be mentioned as examples.

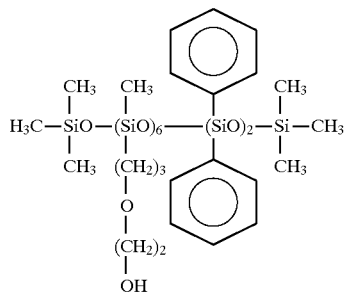

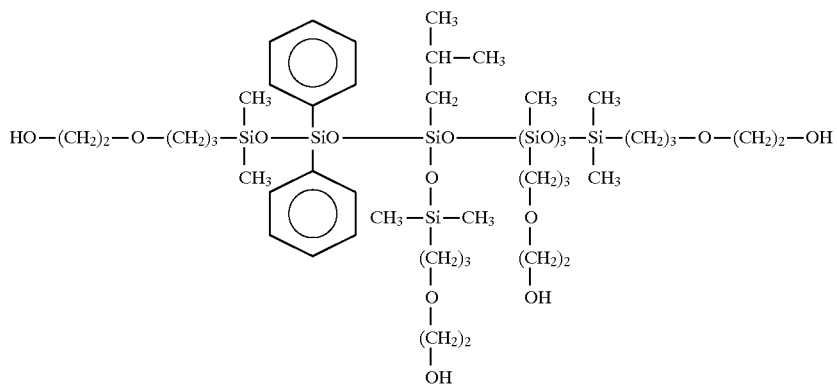

The hydroxyl group-containing silicone polymer (3c) mentioned above preferably contains an average of 3 to 12 hydroxyl groups per molecule. If the average number of hydroxyl groups contained per molecule of said hydroxyl group-containing silicone polymer (3c) is less than 3, curability is insufficient. If 12 is exceeded, viscosity is increased so that it is difficult to increase the concentration of nonvolatile matter of the coating composition.

The acid anhydride group-containing compound (3d) is not particularly limited in kind only if it reacts with a hydroxyl group under ordinary conditions, e.g. room temperature to 120° C. and atmospheric pressure, to generate a carboxyl function. The use of an acid anhydride group-containing compound having a saturated or unsaturated cyclic group of 8 to 12 carbon atoms is preferred because it contributes to enhanced compatibility of resins.

As such, said acid anhydride group-containing compound (3d) includes hexahydrophthalic anhydride, phthalic anhydride, 4-methylhexahydrophthalic anhydride, tetrahydrophthalic anhydride and trimellitic anhydride, among others.

The half-esterification reaction between said hydroxyl group-containing silicone polymer (3c) and said acid anhydride group-containing compound (3d) can be conducted in the conventional manner, for example at a temperature of room temperature to 120° C. for 30 minutes to 8 hours. If the reaction is conducted at a temperature exceeding 120° C. over a long time, polyesterification reaction takes place to yield a silicone polyester of high molecular weight. Such silicone polyesters have few functional groups and high viscosities so that they are not suited for use in the present invention.

Thus, the curable resin composition of this invention is produced by compounding 5 to 80 weight % of said polymer (1e) containing free and esterified carboxyl groups, 1 to 80 weight % of a hydroxyl group- and epoxy group-containing polymer (2d), and 1 to 50 weight % of an epoxy group- and/or alkoxyl group-containing silicone polymer (3a) as essential components. The weight % values given above are percentages based on the total solid matter of polymers (1e), (2d) and (3a). If the proportions of polymers (1e) and (2d) deviate from the above formulation ranges, curability is sacrificed. If the proportion of silicone polymer (3a) is smaller than the above formulation range, the concentration of solids cannot be increased. If (3a) is used too much, the composition becomes soft and suffers from insufficient cure.

The above compounding ratio is specifically determined in such a manner that the molar ratio of the carboxyl group contained in said polymer (1e) containing free and esterified carboxyl groups to the epoxy group contained in said polymer (2d) containing hydroxyl and epoxy groups and said silicone polymer (3a) containing epoxy and/or alkoxyl groups, namely the (carboxyl group)/(epoxy group) ratio, will be 1/1.6 to 1/0.6. In order that the molar ratio may fall within the above range, the proportions of said three components of the fdpresent invention are respectively selected within the range of (1e) 5 to 80 weight %, the range of (2d) 1 to 80 weight %, and the range of (3a) 1 to 50 weight %. The preferred ranges are (1e) 10 to 70 weight %, (2d) 10 to 70 weight %, and (3a) 3 to 40 weight %. The more desirable ranges are (1e) 20 to 60 weight %, (2d) 20 to 60 weight %, and (3a) 5 to 20 weight %. If the above ratio is smaller than 1/1.6, the coating film undergoes yellowing. On the other hand, if the ratio of 1/0.6 is exceeded, the curability of the product resin composition is sacrificed. The above molar ratio is more preferably 1/1.3 to 1/0.8. It should be understood that when said silicone polymer (3b) containing hydroxyl and carboxyl groups is used in addition to said (3a), said number of moles of carboxyl group is the sum of numbers of moles of carboxyl group contained in said (1e) and said (3b).

The nonvolatile matter (SVS) in the curable resin composition of this invention is preferably not less than 40% in terms of volume and more preferably not less than 45% on the same basis. If the amount of nonvolatile matter is less than the above level, the composition is not suitable for use in the areas where regulations for solvent control are in force.

The mechanism of cure of the curable resin composition of this invention is now explained. First, on heating, the carboxyl group and carboxylic ester group in (1e) react to give an acid anhydride group within (1e), with liberation of free monohydric alcohol. The monohydric alcohol so produced is vaporized and removed from the reaction system. The acid anhydride group generated in (1e) reacts with the hydroxyl group of (2d) to form a crosslink and a free carboxyl group is regenerated. This carboxyl group and the carboxyl group initially present in (1e) react with the epoxy groups in (2d) or, where (3a) contains an epoxy group, with the epoxy groups of (2d) and (3a) to form crosslinks.

On the other hand, when (3a) contains alkoxyl groups, the alkoxyl group of (3a) reacts with the hydroxyl group of (2d) to form a crosslink. The liberated monohydric alcohol is vaporized and removed from the reaction system. The alkoxyl group is hydrolyzed by the water present in the reaction system to give a silanol group and a monohydric alcohol. The dmonohydric alcohol thus produced is evaporated and removed from the reaction system. The silanol group formed in (3a) undergoes dehydrative condensation with the hydroxyl group of (2d) and between silanol groups to form crosslinks. The byproduct water is vaporized and removed from the system. The silanol group reacts with the alkoxyl group to form a crosslink with elimination of alcohol. The alcohol thus liberated is vaporized and removed from the system. In this manner, the curable resin composition cures progressively as the result of interaction of (1e), (2d) and (3a).

It will be apparent from the above reactions that where (3a) contains alkoxyl groups, the alkoxyl group invariably exists in the form of an alkoxysilyl group.

In the curable resin composition of this invention, a curing catalyst such as a quaternary ammonium salt which is usually employed for an esterification reaction between an acid and an epoxy compound can be incorporated. The curing catalyst that can be employed includes benzyltriethylammonium chloride, benzyltriethylammonium bromide, tetrabutylammonium chloride, tetrabutylammonium bromide, tetrabutylammonium salicylate, tetrabutylammonium glycolate, tetrabutylammonium p-toluenesulfonate and so on. These catalysts can be used in combination.

The preferred compounding amount of said catalyst is 0.1 to 2.0 weight % based on the solid matter of resin.

For the curable resin composition of the present invention, an organotin compound can be used as a catalyst in combination with the above-mentioned curing catalyst as disclosed in Japanese Kokai Publication Hei-2-151651 and Japanese Kokai Publication Hei-2-279713.

The tin compound mentioned above includes dibutyltin bis(methylmalate), dibutyltin bis(ethylmalate), dibutyltin bis(butylmalate), etc. The preferred compounding weight ratio of said curing catalyst and said tin compound is 1/4 to 1/0.2.

For enhanced crosslinking density and improved water resistance of the curable resin composition of the present invention, an aminoplast curing agent, a blocked isocyanate, etc. can also be employed. Melamine resin and others can be mentioned as examples and one or more of them can be employed.

There is no particular limitation on the method for production of the curable resin composition of the present invention.

The coating composition of the present invention can be provided by formulating the curable resin composition of the present invention in the conventional manner. As the solvent for use in the production of the coating composition of the present invention, organic solvents that are conventionally used in coatings or a mixture of such solvents can be employed. Among such solvents may be mentioned aromatic hydrocarbon solvents such as toluene and xylene, aliphatic hydrocarbon solvents such as n-hexane and heptane, petroleum cracking fractions composed predominantly of aliphatic hydrocarbons and containing aromatic hydrocarbons, esters such as butyl acetate, ethylene glycol diacetate, 2-ethoxyethyl acetate, etc., ketones such as methyl isobutyl ketone, and alcohols such as butyl alcohol.

For improved weather resistance of the coat formed from said coating composition, an ultraviolet absorber, e.g. benzophendne derivatives, benzotriazole derivatives, etc., a hindered amine light stabilizer, a phenolic antioxidant, etc. can be added. Aside from the above additives, a rheology modifier (an agent for sag control) such as a particulate crosslinked resin, and a surface modifier for modulating the appearance of the coat can also be added.

For adjusting the viscosity of said coating composition, among other purposes, an alcoholic solvent such as methanol, ethanol, propanol, butanol, etc., a hydrocarbon solvent, an ester solvent or the like can be used as the diluent.

For an increased storage stability of said coating composition, a hydrolyzable ester solvent such as trimethyl orthoformate, trimethyl orthoacetate, triethyl orthoacetate, etc. can also be added. The preferred level of addition of this solvent is 1 to 10 weight % relative to the paint.

The coating composition of the present invention can be applied by spray coating, brush coating, dip coating, roll coating, flow coating, rotary atomizing coating or other method.

For use of the coating composition of the present invention as a clear paint, the composition may be applied by the per se conventional method but, if desired, after application of a base coat to a substrate, it may be coated on the base coat in a wet-on-wet manner. The coating for the base coat may be water-based or solvent-based but where a water-based coating is used, the base coat is preferably heated at 60° to 100° C. for 2 to 10 minutes prior to application of the clear paint so that a more satisfactory finished film may be obtained.

The coating composition of the present invention can be applied to essentially all kinds of substrates, such as wood, metal, glass, cloth, plastics, foams, etc. or surfaces treated with a variety of primers. The coating composition of the present invention can be applied with particular advantage to plastic and metallic surfaces. Generally the optimum film thickness varies with different uses but is preferably 20 to 100 $\mu$m in many instances.

After application, the coat is cured. To attain a cured coating film of high crosslink density, curing is performed at 100° to 180° C. and preferably at 120° to 160° C. The necessary cure time depends on curing temperature but may generally be 10 to 30 minutes at 120° to 160° C.

The curable resin composition of the present invention can be used advantageously as a clear coating composition. As the base coating for use in this application, a color pigment-containing water-based coating or a color pigment-containing organic solvent type coating is preferred. The preferred coating method is the two-coat one-bake method which comprises coating the curable resin composition of the present invention on a based coat which has not been cured as yet and baking the two coats at a time.

However, when a water-based coating is used, the base coat is preferably heated at 60° to 100° C. for 2 to 10 minutes prior to application of the clear coating in order to achieve an improved finished appearance. As the base coating, the coatings disclosed in U.S. Pat. No. 5151125 and U.S. Pat. No. 5183504 can be utilized. Particularly the water-based coating composition described in Example 1 of U.S. Pat. No. 5183504 is most suitable in terms of finished appearance and performance characteristics.

When the curable resin composition of the present invention is used as a clear coating composition, a still more satisfactory coat can be obtained by a method which comprises coating a clear coating composition containing the curable resin composition of the present invention on the surface of a base coat and further coating the clear coating composition containing the curable resin composition of the present invention in superimposition as a finish coat.

Coating compositions containing the curable resin composition of the present invention as a binder component can be coated on various articles. The articles that can be coated are virtually not limited only if the curable resin composition can be heat-cured thereon. Thus, for example, automotive bodies and car parts such as wheels and bumpers, household electrical appliances such as air-conditioner outdoor installations, and building materials such as exterior sidings.

EXAMPLES

The following examples are further illustrative of the present invention but by no means limitative of the scope of the present invention.

Production Example 1

A polymer containing carboxyl and carboxylic anhydride groups

A 3L reactor equipped with a thermometer, stirrer, condenser, nitrogen inlet pipe and drip funnel was charged with 700 parts by weight of xylene and 350 parts by weight of Solvesso 100 and the temperature was increased to 130° C. using the drip funnel, a solution composed of 300 parts by weight of styrene monomer, 109 parts by weight of 2-ethylhexyl methacrylate, 325 parts by weight of isobutyl acrylate, 25.7 parts by weight of acrylic acid, 240 parts by weight of maleic anhydride, 300 parts by weight of propyleneglycol monomethyl ether acetate, 150 parts by weight of t-butylperoxy-2-ethylhexanoate and 150 parts by weight of xylene was fed dropwise to the reactor over a period of 3 hours. After completion of dropwise addition, the mixture was maintained at 130° C. for 30 minutes, at the end of which time a solution composed of 20 parts by weight of t-butylperoxy-2-ethylhexanoate and 20 parts by weight of xylene was added dropwise over 30 minutes. After completion of dropwise addition, the reaction was further continued at 130° C. for one hour and the solvent was then distilled off 1100 parts by weight of the solvent to provide carboxyl group- and carboxylic anhydride group-containing polymer solution (a-1) with a nonvolatile content of 70% and a number average molecular weight of 2000.

Production Example 2

A carboxylic anhydride group-containing polymer

Using 70 parts by weight of Solvesso 100, 52 parts by weight of xylene, 30 parts by weight of styrene, 16.5 parts by weight of i-butylmethacrylate, 31.5 parts by weight of n-butylmethacrylate, 22 parts by weight of maleic anhydride, 30 parts by weight of propyleneglycol monomethyl ether acetate and 17 parts by weight of t-butylperoxy-2-ethylhexanoate, the procedure of Production Example 1 was otherwise repeated to provide a carboxylic anhydride group-containing polymer solution (a-2) with a nonvolatile content of 65% and a number average molecular weight of 2000 after removal of 98 parts by weight of the solvent.

Production Example 3

A polymer containing free and esterified carboxyl groups

To 1590 parts by weight of the polymer solution (a-1) obtained in Production Example 1 were added 2 parts by weight of triethylamine and 125 parts by weight of methanol and the reaction was conducted at 60° C. for 8 hours to provide a polymer solution (A-1) containing free and esterified carboxyl groups. The infrared absorption spectrum of this polymer solution (A-1) was determined to confirm disappearance of acid anhydride absorption (1785 cm$^{-1}$). The acid value of the solid matter of this polymer solution (A-1) was 158 (mgKOH/g).

Production Example 4

A polymer containing free and esterified carboxyl groups

Using 171 parts by weight of the polymer solution (a-2) obtained in Production Example 2, 0.2 part by weight of trimethylamine and 57 parts by weight of methanol, the procedure of Production Example 3 was otherwise repeated to provide a polymer solution (A-2) containing both free and esterified carboxyl groups. The acid value of the solid matter of polymer solution (A-2) was 126 (mgKOH/g).

Production Example 5

A polymer containing hydroxyl and epoxy groups

A 3L reactor equipped with a thermometer, stirrer, condenser, nitrogen gas inlet pipe and drip funnel was charged with 700 parts by weight of xylene and 525 parts by weight of propyleneglycol monomethyl ether acetate and the temperature was increased to 130° C. Through the drip funnel, a solution containing 200 parts by weight of VeoVa 9, 229 parts by weight of glycidyl methacrylate, 231 parts by weight of 4-hydroxybutyl acrylate, 340 parts by weight of cyclohexyl methacrylate, 120 parts by weight of t-butylperoxy-2-ethylhexanoate, and 200 parts by weight of xylene was dripped into the reactor over 3 hours. After completion of dropwise addition, the reaction mixture was maintained at 130° C. for 30 minutes. Then, a solution composed of 10 parts by weight of t-butylperoxy-2-ethylhexanoate and 50 parts by weight of xylene was added dropwise over 30 minutes. After completion of dropwise addition, the reaction was further continued at 130° C. for one hour, at the end of which time 1200 parts by weight of the solvent was distilled off to provide a polymer solution (B-1) containing both hydroxyl and epoxy groups and having a nonvolatile content of 77%, a number average molecular weight of 1800, an epoxy equivalent of 625 and a hydroxyl equivalent of 623.

Production Example 6

A polymer containing hydroxyl and epoxy groups

Using 950 parts by weight of xylene, 525 parts by weight of propyleneglycol monomethyl ether acetate, 233 parts by weight of VeoVa 9, 381 parts by weight of glycidyl methacrylate, 244 parts by weight of 4-hydroxybutyl acrylate, 142 parts by weight of isobutyl methacrylate and 120 parts by weight of t-butylperoxy-2-ethylhexanoate, the procedure of Production Example 5 was otherwise repeated and 1200 parts by weight of the solvent was removed to provide a polymer solution (B-2) containing hydroxyl and epoxy groups and having a nonvolatile content of 77%, a number average molecular weight of 1800, an epoxy equivalent of 376 and a hydroxyl equivalent of 591.

Production Example 7

A polymer containing hydroxyl and epoxy groups

Using 950 parts by weight of xylene, 525 parts by weight of propyleneglycol monomethyl ether acetate, 102 parts by weight of VeoVa 9, 545 parts by weight of 3,4-epoxycyclohexylm ethyl methacrylate, 244 parts by weight of 4-hydroxybutyl acrylate, 62 parts by weight of isobutyl methacrylate and 121 parts by weight of t-butylperoxy-2-ethylhexanoate, the procedure of Production Example 5 was otherwise repeated and 1200 parts of the solvent was removed to provide a polymer solution (B-3) containing hydroxyl and epoxy groups and having a nonvolatile content of 77%, a number average molecular weight of 1800, an epoxy equivalent of 376, and a hydroxyl equivalent of 591.

Production Example 8

A polymer containing epoxy groups

Using 950 parts by weight of xylene, 525 parts by weight of propyleneglycol monomethyl ether acetate, 200 parts by weight of VeoVa 9, 381 parts by weight of glycidyl methacrylate, 200 parts by weight of cyclohexyl acrylate, 219 parts by weight of isobutyl methacrylate, and 121 parts by weight of t-butylperoxy-2-ethylhexanoate, the procedure of Production Example 5 was otherwise repeated and 1200 parts by weight of the solvent was removed to provide a polymer solution (B-4) not containing hydroxyl groups but containing epoxy groups with a nonvolatile content of 77%, a number average molecular weight of 1800, and an epoxy equivalent of 376.

The silicone polymer containing epoxy and/or alkoxyl groups

The silicone polymer of general formula (II) wherein $R^1$, $R^3$ and $R^6$ each represents methyl and $R^2$ and $R^4$ each represents that of methoxy/butoxy=1/1, $R^3$ represents that of methoxy/γ-glycidoxypropyl=1/1, q=5, m=4, n=2 and having an epoxy equivalent of 625 and an alkoxyl equivalent of 83 (manufactured by Mitsubishi Kasei Corporation, MKC Silicate MSEP-HB2) was used as (C-1).

A silicone polymer of general formula (II) wherein $R^1$ and $R^3$ each represents methyl, $R^2$, $R^4$ and $R^5$ each represents methoxy, q=7, m=2, n=0 and having an alkoxyl equivalent of 81 (manufactured by Shin-Etsu Chemical Co., KC-89S) was used as (C-2).

A silicone polymer of general formula (II) wherein $R^2$, $R^3$, $R^4$ and $R^5$ each represents methyl, $R^2$ represents γ-glycidoxypropyl, q=10, m=2, n=0 and having an epoxy equivalent of 190 (manufactured by Nippon Unicar Co., F-244-05) was used as (C-3).

A silicone polymer of general formula (II) wherein $R^1$ represents methyl, $R^2$ represents that of γ-glycidoxypropyl/(trimethoxysilyl)ethyl=2/1, $R^3$, $R^4$ and $R^5$ each represents methyl, q=6, m=2, n=0, and having an epoxy equivalent of 318 and an alkoxyl equivalent of 213 (manufactured by Nippon Unicar Co., F-244-09) was used as (C-4).

A silicone polymer of general formula (II) wherein $R^2$, $R^3$, $R^4$ and $R^5$ each represents methyl, $R^2$ represents that of γ-glycidoxypropyl/phenethyl=2/1, q=6, m=2, n=0, and having an epoxy equivalent of 297 (manufactured by Nippon Unicar Co., F-244-06) was used as (C-5).

Melamine resin

Cymel 327 (manufactured by Mitsui-Cytec Co.) was used as (D-1).

Curing catalyst

Tetrabutylammonium glycolate was used as (E-1) and dibutyltin bis(butylmalate) as (F-1).

Stabilizer

Triethyl orthoformate was used as (G-1).

Surface conditioner

Modaflow (manufactured by Monsanto) was used as (H-1).

Ultraviolet absorber

Tinuvin 900 (manufactured by Ciba-Geigy) was used as (I-1).

Antioxidant

Tinuvin 123 (manufactured by Ciba-Geigy) was used as (J-1).

Production Example 9

Preparation of a coated plate

A 0.8 mm-thick dull steel plate treated with zinc phosphate was electrocoated with a cationic electrodeposition paint (Power Top pu-50, Nippon Paint Co.) in a dry thickness of about 25 μm. This electrocoating film was further air spray-coated with an intermediate coating (Orga P-2 intermediate coat, manufactured by Nippon Paint Co.) in a dry thickness of about 40 μm, followed by 30-minute baking at 140° C.

Then, this coated plate was air spray-coated with an acryl-melamine solvent type base paint (manufactured by Nippon Paint Co.) in a dry thickness of about 16 μm followed by about 7 minutes' setting. Where a water-based base coating (manufactured by Nippon Paint Co.) was used, air spray-coating was followed by about 1 minute of setting and 5 minutes' preheating at 80° C.

The solvent type base coating was prepared by compounding 50 parts by weight of an acrylic resin (80% solids, acid value=30, OH value=100, number average molecular weight 1800), 40 parts by weight of Cymel 202 (Mitsui Cytec Co.) and 10 parts by weight of Cymel 327 (Mitsui Cytec Co.) for melamine resin, 10 parts by weight of Alpaste 60–600 (Toyo Aluminum Co.) for pigment, and 7 parts by weight of isopropyl alcohol.

The water-based base coating was prepared by formulating 56 parts by weight of aqueous acrylic resin (50% solids, acid value=58, OH value=70, number average molecular weight=12000), 15 parts of Cymel 303 (Mitsui Cytec Co.), 21.5 parts by weight of urethane emulsion (33% solids, acid value=16.2), 7.5 parts by weight of Alpaste 7160N (Toyo Aluminum Co.) for pigment, and 1 part by weight of isostearyl phosphate for stabilizer.

Coating with the coating composition of the invention

Coating compositions of the solid compositions shown in Tables 1 and 2 were respectively adjusted to a Ford cup No. 4 viscosity of 30 seconds and using an electrostatic coating machine, Auto Rea (Randsburg-Gema), each was coated at a spray pressure of 5 kg/cm$^2$ in a dry film thickness of about 40 μm and after about 7 minutes of setting, baked at 140° C. for 25 minutes.

Evaluation of coating film characteristics

1. SVS (nonvolatile matter)

After the viscosities of the coatings were uniformly adjusted to a Ford cup No. 4 viscosity of 30 seconds/20° C. 0.5 g was accurately taken from each coating, diluted with 3 cc of toluene, baked at 110° C. for one hour, and the nonvolatile matter (weight) was determined and converted to volume. The results are shown in Tables 1 and 2.

2. Pencil hardness

Determined according to JIS K 5400, 8.4.2.

3. Water resistance

Each testpiece was immersed in tap water at 40° C. and allowed to stand for 10 days. Thereafter, the coating film of the testpiece was visually inspected. Evaluation was made according to the following criteria. The results are shown in Tables 1 and 2.

○: No abnormality
Δ: Slight film abnormality
x : Overt film abnormality

4. Mar resistance

A 2×2 cm flannel cloth coated with 1 g of 50% aqueous dispersion of cleanser (New Homing Cleanser, Kao Corporation) was mounted on a Gakushin-type color friction fastness tester (manufactured by Daiei Kagaku Seiki). Under a load of 500 g, the sliding head was reciprocated for 20 cycles and the 20° gloss of the test area was determined to calculate the gloss retention. The results are shown in Tables 1 and 2.

◎: gloss retention ≧85%
○: gloss retention ≧70% to <85%
Δ: gloss retention ≧40% to <70%
x : gloss retention <40%

5. Acid resistance

The specimen was contacted with 0.5 cc of 1 wt. % aqueous solution of sulfuric acid at 75° C. for 30 minutes and the surface of the-coat was visually inspected and evaluated according to the following criteria. The results are shown in Tables 1 and 2.

◎: No abnormality
○: Small traces
Δ: Large traces
x : Film abnormalities found

TABLE 1

|  | Examples | | | | | | | | | | |
|---|---|---|---|---|---|---|---|---|---|---|---|
|  | 1 | 2 | 3 | 4 | 5 | 6 | 7 | 8 | 9 | 10 | 11 |
| Polymer A-1 | 36.4 | 36.4 | — | 36.4 | 36.3 | — | 50.5 | 43.8 | 56.2 | 44.9 | 29.1 |
| Polymer A-2 | — | — | 41.7 | — | — | 41.6 | — | — | — | — | — |
| Polymer B-1 | 58.6 | 53.6 | 46.3 | 48.6 | 43.7 | 38.4 | — | — | — | — | 50.9 |
| Polymer B-2 | — | — | — | — | — | — | 29.5 | 36.2 | 23.8 | 35.1 | — |
| Polymer B-3 | — | — | — | — | — | — | — | — | — | — | — |
| Polymer B-4 | — | — | — | — | — | — | — | — | — | — | — |
| Polymer C-1 | 5.0 | 10.0 | 10.0 | 15.0 | 20.0 | 20.0 | — | — | — | 20.0 | — |
| Polymer C-2 | — | — | — | — | — | — | — | — | — | — | 20.0 |
| Polymer C-3 | — | — | — | — | — | — | — | — | — | — | — |
| Polymer C-4 | — | — | — | — | — | — | 20.0 | 20.0 | 20.0 | — | — |
| Polymer C-5 | — | — | — | — | — | — | — | — | — | — | — |
| D-1 | — | — | — | — | — | — | — | — | — | — | — |
| E-1 | 1.0 | 1.0 | 1.0 | 1.0 | 1.0 | 1.0 | 1.0 | 1.0 | 1.0 | 1.0 | 1.0 |
| F-1 | 1.0 | 1.0 | 1.0 | 1.0 | 1.0 | 1.0 | 1.0 | 1.0 | 1.0 | 1.0 | 1.0 |
| G-1 | 2.0 | 2.0 | 2.0 | 2.0 | 2.0 | 2.0 | 2.0 | 2.0 | 2.0 | 2.0 | 2.0 |
| H-1 | 1.5 | 1.5 | 1.5 | 1.5 | 1.5 | 1.5 | 1.5 | 1.5 | 1.5 | 1.5 | 1.5 |
| I-1 | 2.0 | 2.0 | 2.0 | 2.0 | 2.0 | 2.0 | 2.0 | 2.0 | 2.0 | 2.0 | 2.0 |
| J-1 | 1.0 | 1.0 | 1.0 | 1.0 | 1.0 | 1.0 | 1.0 | 1.0 | 1.0 | 1.0 | 1.0 |
| Base coating | solvent type | solvent type | solvent type | solvent type | solvent type | solvent type | solvent type | solvent type | solvent type | solvent type | solvent type |
| SVS | 49.5 | 50.0 | 50.5 | 51.3 | 52.0 | 53.2 | 51.2 | 51.8 | 50.4 | 51.7 | 52.4 |
| Pencil hardness | F | F | F | F | F | F | H | H | H | H | F |
| Water resistance | ○ | ○ | ○ | ○ | ○ | ○ | ○ | ○ | ○ | ○ | ○ |
| Mar resistance | ○ | ○ | ○ | ○ | ◎ | ◎ | ◎ | ◎ | ◎ | ○ | ○ |
| Acid resistance | ○ | ○ | ○ | ○ | ○ | ○ | ◎ | ◎ | ◎ | ○ | ○ |

TABLE 2

|  | Examples | | | | | | Comparative Examples | | | | | |
|---|---|---|---|---|---|---|---|---|---|---|---|---|
|  | 12 | 13 | 14 | 15 | 16 | 17 | 1 | 2 | 3 | 4 | 5 | 6 |
| Polymer A-1 | 52.9 | 44.4 | 44.9 | 36.3 | 45.5 | 36.3 | 36.4 | 36.3 | 53.3 | 26.3 | 46.6 | — |
| Polymer A-2 | — | — | — | — | — | — | — | — | — | — | — | — |
| Polymer B-1 | 27.1 | 35.6 | — | 43.7 | — | 43.7 | 63.6 | 8.7 | 36.7 | 63.7 | — | — |
| Polymer B-2 | — | — | — | — | 26.7 | — | — | — | — | — | — | — |
| Polymer B-3 | — | — | 35.1 | — | — | — | — | — | — | — | — | — |
| Polymer B-4 | — | — | — | — | — | — | — | — | — | — | 43.4 | Commercial melamine-containing high-solid coating composition |
| Polymer C-1 | — | — | 20.0 | 20.0 | — | 20.0 | — | 55.0 | 10.0 | 10.0 | 10.0 | |
| Polymer C-2 | 20.0 | — | — | — | — | — | — | — | — | — | — | |
| Polymer C-3 | — | — | — | — | — | — | — | — | — | — | — | |
| Polymer C-4 | — | — | — | — | 18.0 | — | — | — | — | — | — | |
| Polymer C-5 | — | 20.0 | — | — | — | — | — | — | — | — | — | |
| D-1 | — | — | — | — | 10.0 | — | — | — | — | — | — | |
| E-1 | 1.0 | 1.0 | 1.0 | 1.0 | 1.0 | 1.0 | 1.0 | 1.0 | 1.0 | 1.0 | 1.0 | |
| F-1 | 1.0 | 1.0 | 1.0 | 1.0 | 1.0 | 1.0 | 1.0 | 1.0 | 1.0 | 1.0 | 1.0 | |
| G-1 | 2.0 | 2.0 | 2.0 | 2.0 | 2.0 | 2.0 | 2.0 | 2.0 | 2.0 | 2.0 | 2.0 | |
| H-1 | 1.5 | 1.5 | 1.5 | 1.5 | 1.5 | 1.5 | 1.5 | 1.5 | 1.5 | 1.5 | 1.5 | |
| I-1 | 2.0 | 2.0 | 2.0 | 2.0 | 2.0 | 2.0 | 2.0 | 2.0 | 2.0 | 2.0 | 2.0 | |
| J-1 | 1.0 | 1.0 | 1.0 | 1.0 | 1.0 | 1.0 | 1.0 | 1.0 | 1.0 | 1.0 | 1.0 | |
| Base coating | solvent type | solvent type | solvent type | solvent type | solvent type | water-based | solvent type | solvent type | solvent type | solvent type | solvent type | solvent type |
| SVS | 50.6 | 52.1 | 51.9 | 52.0 | 50.7 | 52.0 | 46.4 | 60.0 | 47.0 | 52.0 | 51.0 | 49.0 |
| Pencil hardness | F | F | H | F | 2H | F | HB | 2B | F | 2B | HB | F |
| Water resistance | ○ | ○ | ○ | ○ | ○ | ○ | ○ | X | ○ | Δ | ○ | ○ |

TABLE 2-continued

|  | Examples | | | | | | Comparative Examples | | | | | |
| --- | --- | --- | --- | --- | --- | --- | --- | --- | --- | --- | --- | --- |
|  | 12 | 13 | 14 | 15 | 16 | 17 | 1 | 2 | 3 | 4 | 5 | 6 |
| Mar resistance | ○ | ⊚ | ⊚ | ⊚ | ⊚ | ⊚ | Δ | ○ | X | ○ | Δ | Δ |
| Acid resistance | ⊚ | ⊚ | ○ | ○ | ○ | ○ | ○ | Δ | ○ | Δ | ○ | X |

INDUSTRIAL APPLICABILITY

The curable resin composition of this invention provides for a coating film with high acid resistancea and mar resistance and imparts a high quality appearance. The coating composition obtainable with the curable resin composition of this invention can be provided with a high-solid feature and can be advantageously used for automotive parts and exterior building materials, among other uses.

We claim:

1. A curable resin composition comprising 5 to 80 weight %, based on the nonvolatile matter in the resin composition, of a polymer containing free and esterified carboxyl groups and having an acid value of 50 to 300 mg KOH/g (1e) as obtained by reacting an acid anhydride group-containing polymer (1c), which is obtained by copolymerizing 10 to 40 weight %, based on the total amount of monomers constituting (1e), of an acid anhydride group-containing ethylenically unsaturated monomer (1a) with 90 to 60 weight %, based on the total amount of monomers constituting (1e), of a copolymerizable other ethylenically unsaturated monomer (1b), with a monohydric alcohol of 1 to 12 carbon atoms (1d) in the ratio (the number of mols of acid anhydride group in acid anhydride-containing polymer (1c))/(the number of mols of hydroxyl group in monohydric alcohol (1d)) of 1/10 to 1/1, 1 to 80 weight %, based on the nonvolatile matter in the resin composition, of a hydroxyl group- and epoxy group-containing polymer having an epoxy equivalent of 200 to 1000 and a hydroxyl equivalent of 250 to 1500 (2d) as obtained by copolymerizing 5 to 60 weight %, based on the total amount of monomers constituting (2d), of a hydroxylalkyl (meth) acrylate monomer (2a) of the general formula (I):

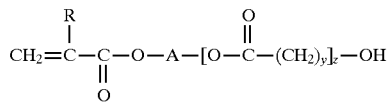

wherein R represents hydrogen or methyl; A represents a straight-chain or branched alkylene group of 2 to 8 carbon atoms; y represents a whole number of 3 to 7; z represents a whole number of 0 to 4; with 10 to 60 weight %, based on the total amount of monomers constituting (2d), of an epoxy group-containing ethylenically unsaturated monomer (2b) and 0 to 85 weight %, based on the total amount of monomers constituting (2d), of an ethylenically unsaturated monomer (2c) copolymerizable therewith, and 1 to 50 weight %, based on the nonvolatile matter in the resin composition, of an epoxy group- and alkoxyl group-containing silicone polymer (3a) of the general formula (II):

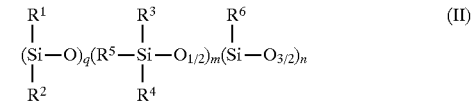

wherein $R^1$, $R^2$, $R^3$, $R^4$, $R^5$, and $R^6$ are the same or different and each represents alkyl of 1 to 10 carbon atoms, phenyl, phenethyl, alkoxyl of 1 to 5 carbon atoms, $R^7$-Si(OR$^8$)$_3$, $R^7$-Si(OR$^8$)$_2$CH$_3$, $R^7$-Si(OR$^8$)(CH$_3$)$_2$, or $R^7$-Y; $R^7$ represents a straight-chain or branched alkylene group which may have an ether bond and/or an ester bond; $R^8$ represents alkyl of 1 to 5 carbon atoms; Y represents an epoxy group-containing acyclic or cyclic hydrocarbon residue; q represents a whole number of 1 to 20, m represents a whole number of 0 to 4, n represents a whole number of 0 to 2; the order of the parenthesized groups occurring in q, m and n repetitions are random and not restricted to the formula shown, wherein the molar ratio of the carboxyl group contained in said polymer containing free and esterified carboxyl groups (1e) to the epoxy group contained in said hydroxyl group- and epoxy group-containing polymer (2d) and the epoxy group contained in said epoxy group- and alkoxyl group-containing silicone polymer (3a), carboxyl group/epoxy group ration is 1/1.6 to 1/0.6.

2. The curable resin composition according to claim 1 wherein said copolymerizable other ethylenically unsaturated monomer (1b) is a carboxyl group-containing monomer (1b$^2$).

3. The curable resin composition according to claim 1 wherein said acid anhydride group-containing polymer (1c) has a number average molecular weight of 1500 to 8000.

4. The curable resin composition according to claim 1 wherein said acid anhydride group-containing polymer (1c) contains at least two acid anhydride groups on the average per molecule.

5. The curable resin composition according to claim 1 wherein said hydroxyl group- and epoxy group-containing polymer (2d) has a number average molecular weight of 1500 to 8000.

6. The curable resin composition according to claim 1, which contains a quaternary ammonium salt catalyst.

7. The curable resin composition according to claim 1, which contains an organotin compound.

8. The curable resin composition according to claim 1, which contains a hydrolyzable ester solvent.

9. A coating composition characterized in that it contains the curable resin composition of claim 1, as a binder component.

10. A method of producing a coating film characterized in that it comprises (A) a step of forming an undercoat layer, and an intermediate coating layer where necessary, on a substrate, (B) a step of coating a water-based or solvent-based coating on the coating layer formed in step (A), (C) a step of coating the coating composition of claim 9 in superimposition prior to curing of said base coating, and (D)

a step of causing said base coating and said coating composition of claim 9 to cure.

11. A coated article characterized in that it has a coating layer formed from the coating composition of claim 9.

12. The curable resin composition according to claim 2 which contains a quaternary ammonium salt catalyst.

13. The curable resin composition according to claim 3 which contains a quaternary ammonium salt catalyst.

14. The curable resin composition according to claim 4 which contains a quaternary ammonium salt catalyst.

15. The curable resin composition according to claim 5 which contains a quaternary ammonium salt catalyst.

16. The curable resin composition according to claim 2 which contains an organotin compound.

17. The curable resin composition according to claim 3 which contains an organotin compound.

18. The curable resin composition according to claim 4 which contains an organotin compound.

19. The curable resin composition according to claim 5 which contains an organotin compound.

* * * * *